US010642276B2

United States Patent
Huai

(10) Patent No.: US 10,642,276 B2
(45) Date of Patent: May 5, 2020

(54) CUSTOMIZE AND LEGALIZE SELF-DRIVING MOTOR VEHICLES

(71) Applicant: Xiaoning Huai, Sunnyvale, CA (US)

(72) Inventor: Xiaoning Huai, Sunnyvale, CA (US)

(73) Assignee: Real Imaging Technology Co., ltd, Shenzhen (CN)

( * ) Notice: Subject to any disclaimer, the term of this patent is extended or adjusted under 35 U.S.C. 154(b) by 0 days.

(21) Appl. No.: 15/867,946

(22) Filed: Jan. 11, 2018

(65) Prior Publication Data

US 2018/0136658 A1     May 17, 2018

Related U.S. Application Data

(63) Continuation of application No. 15/810,068, filed on Nov. 12, 2017, now abandoned, which is a
(Continued)

(30) Foreign Application Priority Data

Jun. 26, 2017 (CN) .......................... 2017 1 0490689
Jul. 13, 2017 (CN) .......................... 2017 1 0568488
Nov. 28, 2017 (CN) .......................... 2017 1 1212892

(51) Int. Cl.
*G05D 1/02* (2020.01)
*B60W 40/09* (2012.01)
*G05D 1/00* (2006.01)
*H04L 29/08* (2006.01)
*B60W 50/00* (2006.01)
(Continued)

(52) U.S. Cl.
CPC ........... *G05D 1/0221* (2013.01); *B60W 40/09* (2013.01); *B60W 50/0098* (2013.01); *B60W 50/08* (2013.01); *G05D 1/0088* (2013.01);
*G05D 1/0214* (2013.01); *G06K 9/6262* (2013.01); *H04L 67/306* (2013.01); *B60W 2050/0082* (2013.01); *B60W 2050/0089* (2013.01); *B60W 2540/043* (2020.02)

(58) Field of Classification Search
CPC .. G05D 1/0088; G05D 1/0214; G05D 1/0221; B60W 50/0098; B60W 50/08; B60W 40/09; B60W 2540/28; B60W 2050/0089; B60W 2050/0082; G06K 9/6262; H04L 67/306
USPC ......................................................... 701/23
See application file for complete search history.

(56) References Cited

U.S. PATENT DOCUMENTS

2015/0233719 A1*   8/2015   Cudak .................... G01C 21/26
                                                           701/23
2016/0001781 A1*   1/2016   Fung ..................... B60W 40/08
                                                           701/36
(Continued)

OTHER PUBLICATIONS

Robert Peterson, New Technology—Old Law: Autonomous Vehicles and California's Insurance Framework, Santa Clara University, School of Law, 2012 (Year: 2012).*

*Primary Examiner* — Muhammad Shafi

(57) ABSTRACT

Methods are introduced for customizing and legalizing a self-driving motor vehicle by personalizing and/or disciplining before and during a self-driving motor vehicle is practically used, with human knowledge, preferences and experiences, to provide a more personal service and overcome some hurdles in legalization of self-driving motor vehicles, serving as a bridge in the transition from a human driving world to a personized autonomous freeway.

14 Claims, 7 Drawing Sheets

Related U.S. Application Data continuation of application No. 15/662,282, filed on Jul. 28, 2017, now Pat. No. 10,365,648, which is a continuation of application No. 15/640,528, filed on Jul. 1, 2017, now abandoned, which is a continuation of application No. 15/619,581, filed on Jun. 12, 2017, now abandoned.

(51) Int. Cl.
*B60W 50/08* (2020.01)
*G06K 9/62* (2006.01)

(56) References Cited

U.S. PATENT DOCUMENTS

| | | | |
|---|---|---|---|
| 2016/0187879 A1* | 6/2016 | Mere | G05D 1/0061 701/23 |
| 2016/0232785 A1* | 8/2016 | Wang | G08G 1/012 |
| 2016/0314224 A1* | 10/2016 | Wei | G06F 17/5009 |
| 2017/0217445 A1* | 8/2017 | Tzirkel-Hancock | B60W 50/08 |
| 2017/0267256 A1* | 9/2017 | Minster | G01C 21/3461 |
| 2017/0362076 A1* | 12/2017 | Hall | H04W 4/029 |
| 2018/0174446 A1* | 6/2018 | Wang | G08G 1/0112 |

* cited by examiner

FIG.4

Table 1.

| Response time to events / Factory/Personalized settings | 0 - T1:<br>The Blinking Zone | T1-T2:<br>The Emergency Zone | T2 and beyond:<br>The Cruise Zone |
|---|---|---|---|
| Factory settings | Per factory designs based on common behaviors | Per factory designs based on common behaviors | Per factory designs based on common behaviors |
| Impact of User attributes | Damage control options and alarm settings | Apply scenario-user-choice pair<br>data set vs scenarios | Apply scenario-user-choice pair<br>data set/user profile<br>data set vs scenarios |

CUSTOMIZE AND LEGALIZE SELF-DRIVING MOTOR VEHICLES

TECHNICAL FIELD

Artificial intelligence, manufacture of self-driving motor vehicles, and self-driving motor vehicle license and legalization.

BACKGROUND

Figure 1:
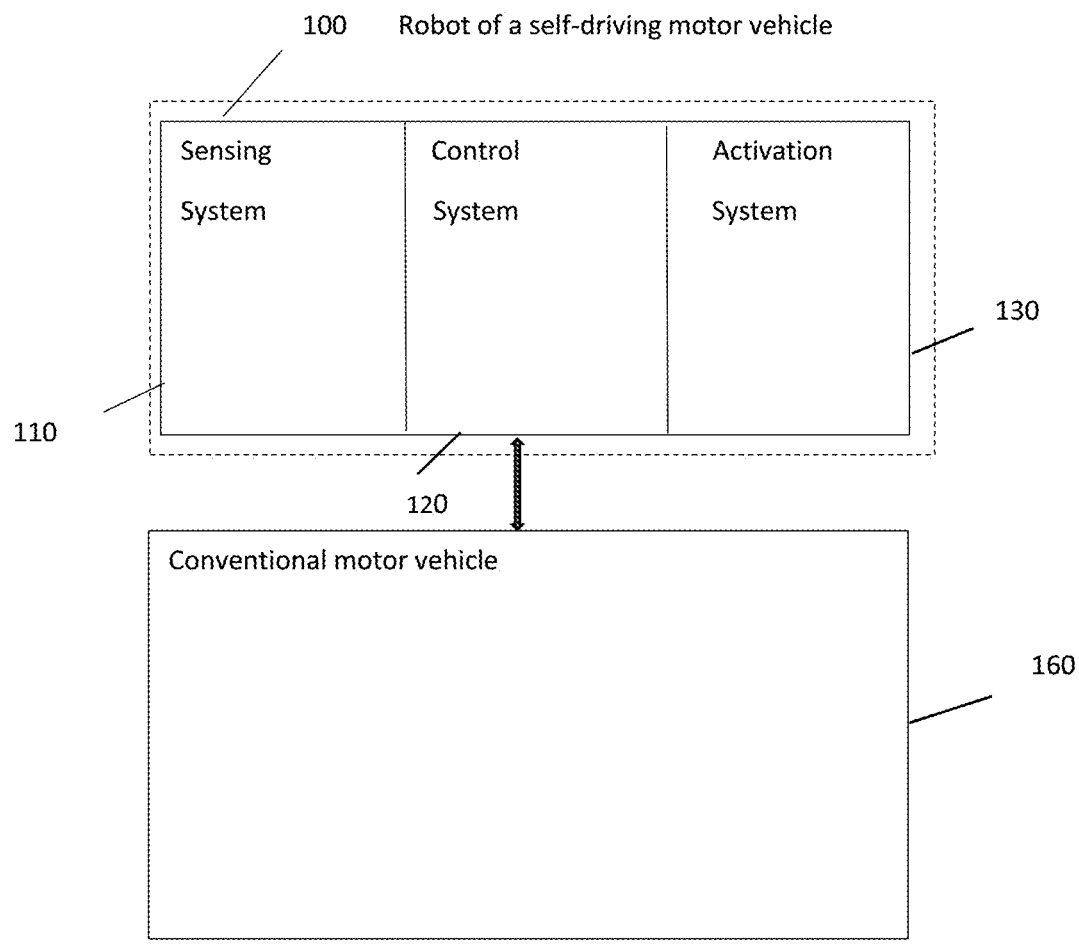

AI (denotes artificial intelligence hereby and hereafter in this disclosure) based driving automation has evolved now to a stage of heavy premarketing road test by several self-driving motor vehicle manufacturers. Among other issues, accidents are occasionally reported calling for more improvements. A self-driving motor vehicle could be viewed as if a robot sits on a conventional motor vehicle, though it does not take the shape of what is commonly presented or perceived, comprising a Sensing System, a Control System and an Activation System, while the conventional motor vehicle should be altered significantly for a better integration, as illustrated in FIG. 1. A self-driving motor vehicle drives itself from one start point to a destination set by a user (denotes an owner or a passenger or rider who rides or uses the self-driving motor vehicle hereby and hereafter in this disclosure) or a remote controller through a wireless communication system or an electronic media device and guided by an automatic navigational system with or without involving a user in the vehicle. It can carry one or more passengers or no passengers, for example when it is sent for a passenger. The robot conducts real-time scene analysis of roadway and traffic events, interprets and applies the traffic rules wherever it is driving, and synchronizes activation System to make the driving for a user. A robot on the self-driving motor vehicle has been trained and learned the general skills and rules of a motor vehicle operation. However, driving as a human activity has many attributes than just moving or transportation, such as safety, comfort, exercise, sport and so on, which vary according to each user's experiences, favors, moral and ethics traits among other things. In case of an emergency or an accident, different users tend to have different preferred operation behaviors by the self-driving motor vehicle, concerning responsibilities, liabilities, and damage controls to different parties involved, among other issues of conflicting interest. Obviously, it would be unlikely for a self-driving motor vehicle with generic factory settings to render preferred operation behaviors for every individual user. From vehicle operation point of view, a fundamental difference between a conventional and a self-driving motor vehicle is that the former provides an essential platform for a user to exercise the operation, while the latter tries to provide a ubiquitous platform essentially without involving a user in its operation. Although there have been vigorous researches on self-driving motor vehicles adapting to a user after it is on the road in the state of art technologies, rare work is reported on customizing a self-driving motor vehicle in production or before it is practically used by a user.

SUMMARY OF THE INVENTION

Disclosed hereby is a first method of customizing a self-driving motor vehicle by personalizing and/or disciplining a self-driving motor vehicle before the self-driving motor vehicle is practically used, and refining the customizing during the driving, comprising the steps of: obtaining by designing and/or receiving a designed training collection of scenarios and one or more selective operation behaviors of a self-driving motor vehicle in each of the scenarios; acquiring initially a scenario-user-choice pair data set and/or a user profile data set before a self-driving motor vehicle is practically used; identifying a current user; applying data in the entry of the current user in a scenario-user-choice pair data set and/or in the entry of the current user in a user profile data set in operating a self-driving motor vehicle; updating the data in the entry of the current user in the scenario-user-choice pair data set and/or the in the entry of the current user in the user profile data set during the driving; applying both the initially acquired and the updated data in the entry of the current user in the scenario-user-choice pair data set and/or in the entry of the current user in the user profile data set in operating the self-driving motor vehicle.

Disclosed hereby are criteria as an extended application of the disclosed method for legalization of and issuing a vehicle driver license and/or a sale and/or a service permit to a self-driving motor vehicle, or a purchase and/or service permit to a user thereof.

Disclosed hereby is a process of manufacturing a self-driving motor vehicle by a custom design as an embodiment of the invented method.

BRIEF DISCUSSION OF DRAWINGS

FIG. 1 Illustration of a functional structure of a self-driving motor vehicle.

Figure 2:
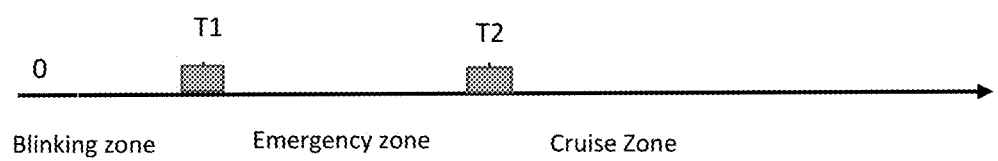

FIG. 2 Illustration of categorized response time interval to roadway and traffic events, the shaded area around T1 and T2 indicate it should be considered as a zone with a boundary varying from model to model, and from time to time.

Figure 3:
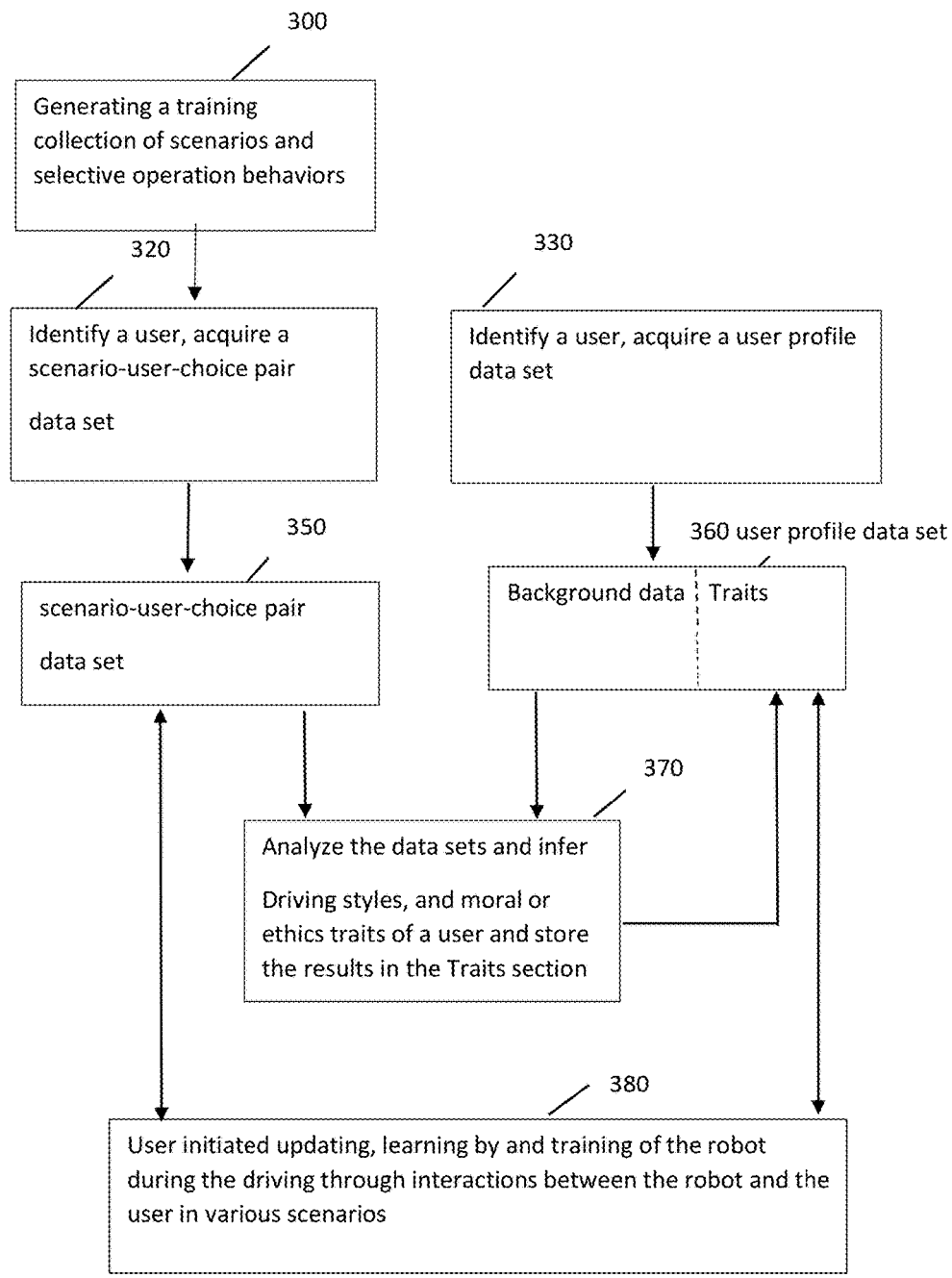

FIG. 3 Illustration of the procedures to customize a self-driving motor vehicle.

FIG. 4 Table 1, Example impacts on operation by the user preference data.

Figure 5:
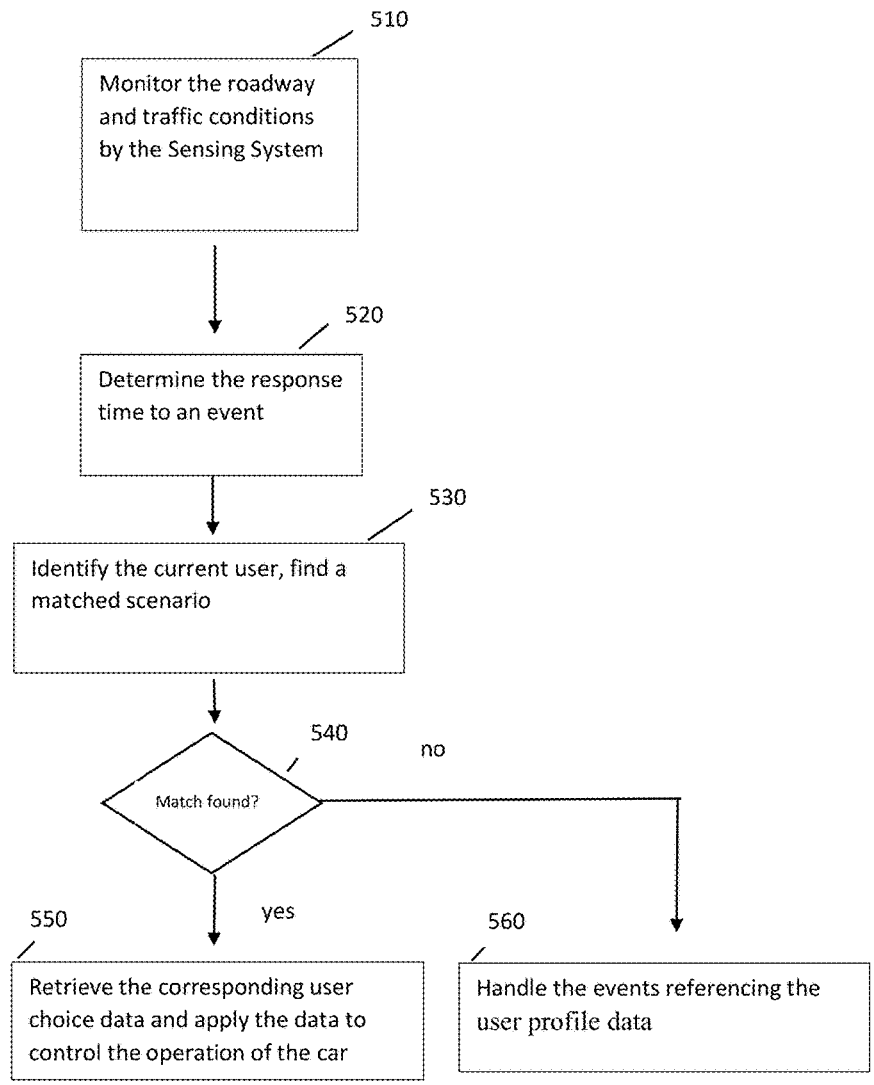

FIG. 5 Illustration of how to apply user data in self-driving.

Figure 6:
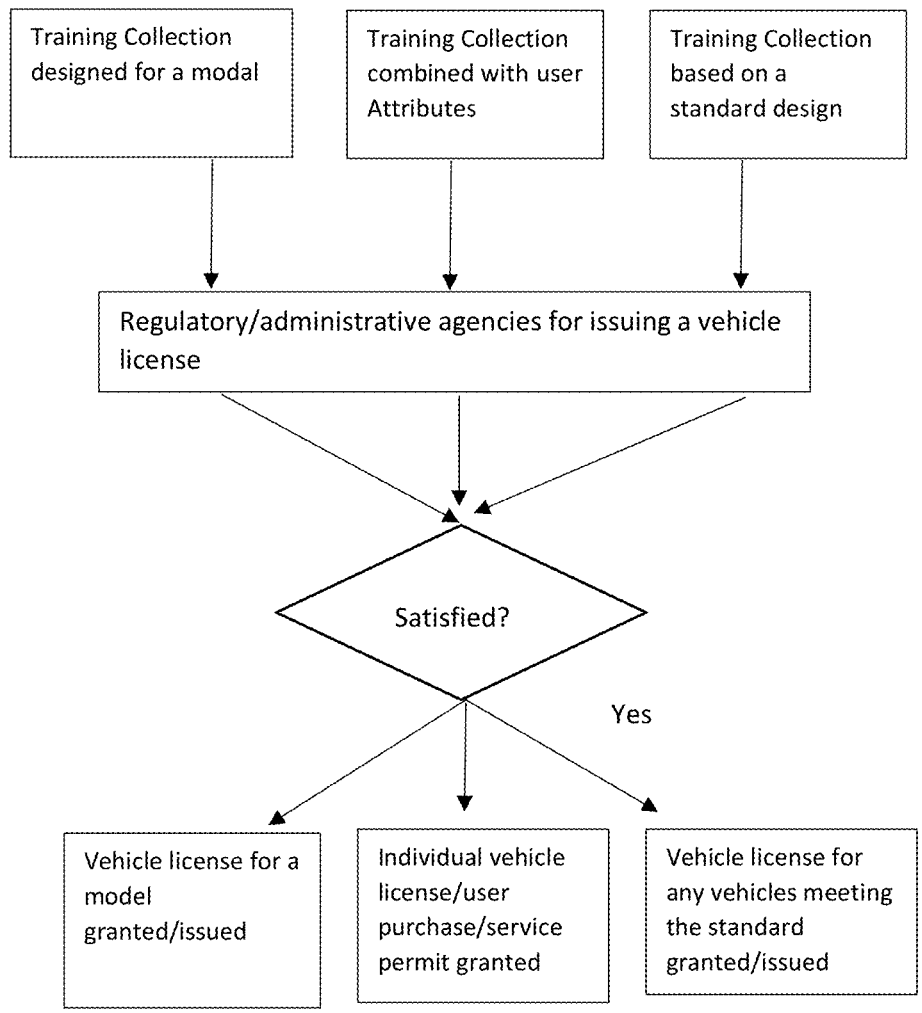

FIG. 6 Illustration of how to issue a vehicle license.

Figure 7:
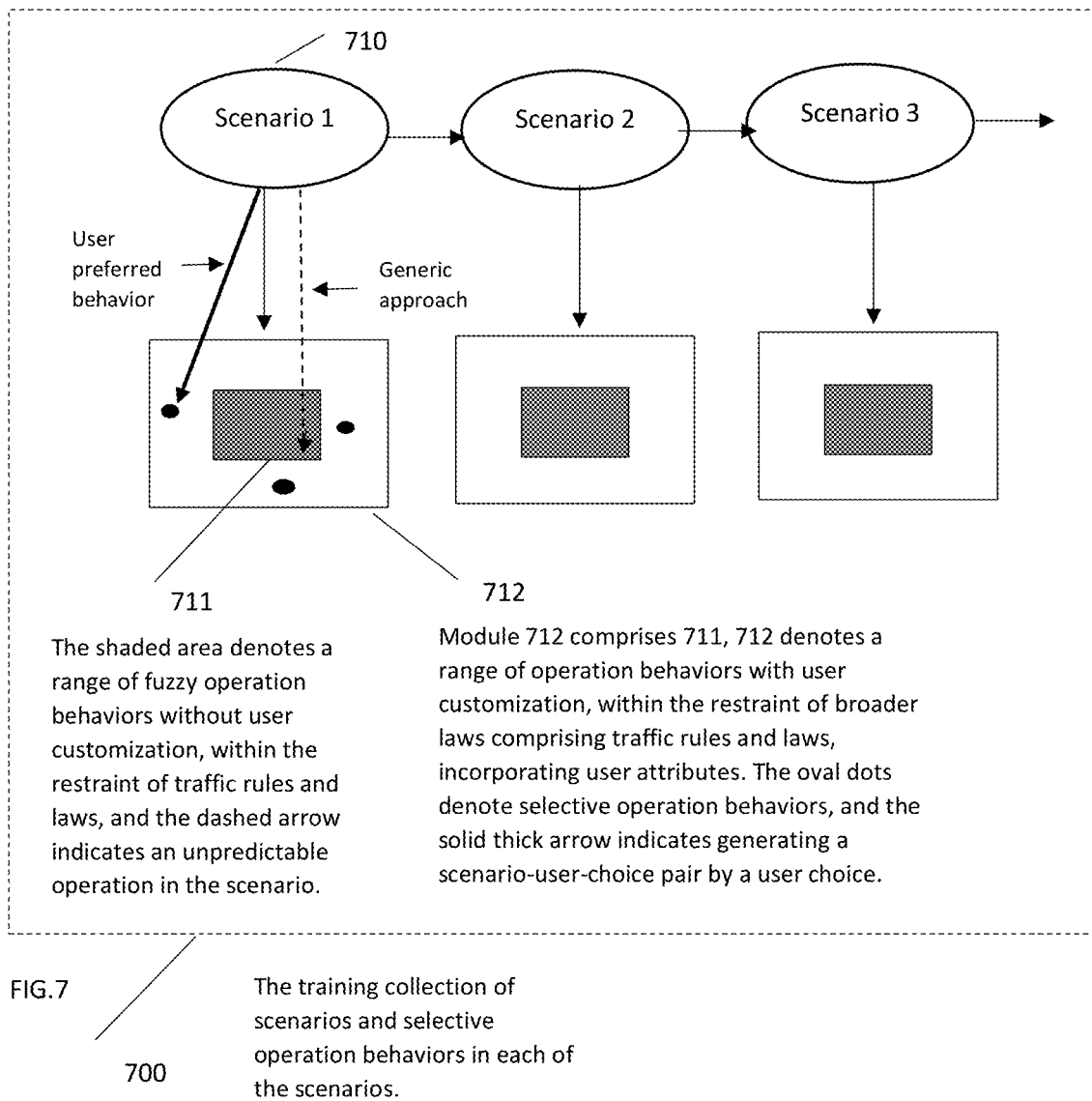

FIG. 7 Illustration of a comparison between a customized and non-customized generic self-driving motor vehicle, and using a training collection in legalization of self-driving motor vehicles.

DETAILED DESCRIPTION OF THE INVENTION

The following descriptions and illustrated example embodiments are intended to explain the invention without limiting the scope of this invention.

The robot of a self-driving motor vehicle keeps monitoring the roadway and traffic as well as the vehicle conditions by its Sensing System, and any events prompting for a responding adjustment of its operation will be analyzed to fall into one of the three conceptually categorized response time intervals, taking into account the distance of an involved object to and the speed of the vehicle, the time needed for the robot to run algorithms and Activation System, and for the activation to take effect, as illustrated in FIG. 2. The parameters separating the zones are a range of values overlapping between the adjacent zones, and are vehicle model dependent and scenario dependent. The interval between time 0 to T1 is hereby referred to as The Blinking Zone, wherein the robot can virtually do little or nothing to address an event or avoid an accident except to minimize the damages and send out alarms if there is an accident. The interval between T1 to T2 is referred to as The Emergency Zone, wherein actions could be taken to address an event or avoid an accident or let an accident happen in one way or another that would put different risks of damages to the user, the vehicle of the user and/or other parties who are involved in the accident, such as other vehicles or pedestrians who happens to share the roadway at the time. The interval from T2 beyond is referred to as the Cruise Zone, wherein the roadway and traffic events are easily manageable, and chance of an accident is very small. Corresponding to each interval, there are sets of data acquired reflecting attributes of a user comprising preferred behaviors in various scenarios, preferred driving styles, and/or moral or ethics traits, which will be used by the robot in control of the vehicle operations, a process hereby referred to as customizing self-driving and is detailed below.

There are two data sets in a data base accessible by the Control System of the robot of the self-driving vehicle, a scenario-user-choice pair data set, and a user profile data set. The term of scenario-user-choice pair is an abbreviation for "scenario and user choice pair" indicating a paired combination between a scenario and the preferred user choice of an operating behavior of a self-driving motor vehicle in the scenario, as illustrated in FIG. 7. A scenario-user-choice pair data set comprise entries of all users, wherein each entry matches an individual user containing data in the form of a list or another type of data structure of scenario-user-choice pairs. The user profile data set comprises entries of all users, wherein each entry matches an individual user containing data in the form of a structure comprising a user background section and a user traits section. A scenario in a scenario-user-choice pair comprises a description of a snapshot or a sequence of snapshots of road way, traffic and the vehicle states, and/or a classified, encoded computational data representation of the description. A scenario-user-choice pair comprises a user preferred behavior of the vehicle operation in a scenario, and/or a classified, encoded computational data representation of a user preferred behavior of the vehicle operation in a scenario. The idea behind a scenario-user-choice pair comes from the perception that there could be multiple options to operate the vehicle in a scenario, and the Control System might get lost to find an optimal approach for a current user, without prior knowledge of the attributes and/or preferences of the current user. The background section of the user profile data comprises a description of personal information data of a user such as age, gender, body height, body weight, profession, marriage status, living area, education level, searchable public records such as of driving, medical, disability, insurance, credit, and crimes; or a classified, encoded computational data representation of the description, while the traits section comprises a description of the driving and/or riding styles, and/or the morality and ethics traits of a user or a classified, encoded computational data representation of the description.

Customizing self-driving starts by an initialization process, which takes place before the vehicle is practically used on a public roadway, using an interactive interface to communicate between a user and a testing apparatus that comprising a robot of a self-driving motor vehicle and/or a stand-alone testing apparatus and/or a human tester operating a testing apparatus, as illustrated in FIG. 3. A training collection is designed comprising a wide range of scenarios and one or more selective vehicle operating behaviors in each of the scenarios, wherein conflicts of interests may exist between attributes of a user of a self-driving motor vehicle, traffic rules and laws, and/or other parties sharing roadways. For each scenario in the training collection, there is one or more selective operation behaviors of a self-driving motor vehicle, which are verified and/or verifiable by simulation and/or road tests, lawful. Design of such a training collection and verification of the training collection by simulation is feasible within the state of the art, while verification by road tests of selective scenario-user-choice pairs is also feasible, though less efficient.

A testing apparatus identifies a user first for example, by a user ID/password. Then the testing apparatus presents to the user one scenario at a time from a training collection of scenarios and one or more selective vehicle operating behaviors in each of the scenarios, obtains a choice by the user of a preferred vehicle operating behaviors in the scenario, and stores the scenario-user-choice pair in the entry of the user in a scenario-user-choice pair data set; or receives obtained data in the entry of the user in a scenario-user-choice pair data set, or combines the obtained and received data, and confirms and/or updates the data prior to a self-driving motor vehicle being practically used in a public roadway. It is important for the testing apparatus to inform a user before and/or during acquiring a scenario-user-choice pair data set that a scenario-user-choice pair comprises a binding commitment between a self-driving motor vehicle and a user that when the vehicle operates according to a user choice in a matched scenario, the user will assume at least partial responsibility for the consequence of the operating. A description of the partial responsibility and/or consequence of the operating for every scenario-user-choice pair is to be communicated to the user, a good example of which is illustrated in The Example 1 below.

Since it is very difficult and lengthy to cover all possible scenarios, some generalization and categorization of scenarios are necessary, and a numeric value within a normalized range indicating a percentage degree of a consent or discontent to a choice of answer is optionally used. The interactive interface between a testing apparatus and the user could be of a visual media such as a touch screen panel for display and input, or an audio media such as a speaker announcement combined with a microphone and a speech recognition module to take the inputs, or a combination thereof, for users without vision or hearing disabilities. For user with disabilities, however, an assistant to the user could help with the initialization to use the above interactive interfaces, or an adaptive device could be designed and installed.

In addition to a scenario-user-choice pair data set, a user profile data set is acquired. Data in the background section of a user profile data set are acquired between a testing apparatus and a user through an interactive interface before or at the time of purchasing or requesting a service of a self-driving motor vehicle based on information provided by a user and/or research by the testing apparatus through a wireless communication system or an electronic media device.

The testing apparatus extracts traits of the user by analyzing the acquired data in the above two data sets based on behavior modeling, factory tests and statistical driving records and stores resulting data in the traits section of the entry of the user in a user profile data set. Both data sets could be partially or fully acquired prior to purchasing or using a service of a self-driving motor vehicle between a user and a manufacturer, a vender or a service provider and delivered to the robot of a self-driving motor vehicle, and will be confirmed and updated if necessary by the robot and a current user before a self-driving motor vehicle is practically used on a public roadway.

An example of impact on operation by scenario-user-choice pair data is illustrated in FIG. 4 Table 1. Since how to handle events in the Emergency Zone between T1 and T2 is most critical and controversial to the safety behavior of a self-driving motor vehicle, some examples are designed and given below as an illustration.

Example 1

A self-driving motor vehicle is driving on a roadway at a normal speed approaching an intersection with a green light, a bicycle suddenly runs red light from one side of the roadway appearing in front of the self-driving motor vehicle. The robot finds braking the vehicle is too late to avoid the accident, but swing the vehicle to the left or right might have a chance, which would violate the traffic rules by running into a wrong lane and have a chance to damage the self-driving motor vehicle, which would be your choice:
A. Brake the vehicle
B. Swing the vehicle.

Example 2

At what risk degree between 0 and 1 would you take to damage your vehicle or harm yourself to avoid running over pedestrians (0 indicates none, 1 indicates full)?
A. 0
B. 1
C. 0.5
D. Undecided.

Example 3

When a collision between the self-driving motor vehicle and another vehicle is unavoidable, which of the following would you choose?
A. Minimize the damage to yourself no matter what happens to the other party
B. Minimize the damage to yourself no matter what happens to the other party if the other party has the liability
C. Take some risk of damaging yourself depending the circumstances to reduce the damage to the other party.

Example 4

When an accident is unavoidable, which of the following would you choose?
A. Minimize the damage to the passenger sitting on the front-left seat
B. Minimize the damage to the passenger sitting on the back-right seat
C. Minimize the damage to myself no matter where I am sitting.

Example 5

Your preferred driving style in highway is:
A. Smooth and steady
B. Swift and jerky
C. Aggressive with sport flavor.

An illustration to how to apply the two sets of user data in real time operation is given in FIG. 5. A robot identifies a current user, by identifying a current rider, or one of current riders of a self-driving motor vehicle being a user having acquired data in the entry of the user in a scenario-user-choice pair data set or having acquired data in the entry of the user in a scenario-user-choice pair data set and the entry of the user in a user profile data set prior to a self-driving motor vehicle being practically used.

In the first place, a self-driving motor vehicle should follow the traffic rules and laws regarding vehicle operations. In response to a scenario during a driving, the robot runs a scenario matching first to find a match between the current scenario and a scenario in the scenario-user-choice pair data set, and apply the user choice data operating the vehicle if a match is found. However, when a match could not be found, the robot refers to the user traits data in the entry of the current user in the user profile data set to generate a suggestion how to handle the scenario and achieve an optimal solution by considering it together with other options generated by Control System based on non-user-specific analysis. So, there is a clear difference between how to use these two sets of user data.

Object matching is a common technique in the state of the art. Without limiting the scope of invention disclosed in this application, below is an example embodiment how to find a scenario match and apply the scenario-user-choice pair data set in vehicle operations:

Assuming a scenario is represented by a digitally encoded data structure in the form of C (R, T, V), wherein R represents an encoded categorized numeric value of roadway condition (such as a highway or a local street in a city); T represents an encoded categorized numeric value of traffic condition (such as vehicle flow rate indicating the sparsity or congestion of the traffic), and V an encoded categorized numeric value of the self-driving vehicle condition (such as model, speed and passenger numbers and other parameters of operations), Let Ci (Ri, Ti, Vi) represent a scenario in the scenario-user-choice pair data set, and the total number of scenarios is n, wherein Ri, Ti, Vi is a real number between 0 and 1 respectively, and its value is assigned proportional to the risks to the safety of the vehicle operations, normalized by $\Sigma_{i=1}^{n} Ri=1; \Sigma_{i=1}^{n} Ti=1; \Sigma_{i=1}^{n} Vi=1$.

Let C0 (R0, T0, V0) represent a current scenario, and the scenario similarity S is calculated as:

$$S = \left( \frac{(Ri-R0)^2 * \alpha + (Ti-T0)^2 * \beta + (Vi-V0)^2 * \gamma}{3} \right)^{0.5}, \quad [1]$$

wherein $\alpha$, $\beta$, and $\gamma$ are risk weighting factors in the range between 0 and 1, and it is obvious the smaller S, the higher similarity.

Applying [1] to find the minimum scenario similarity Smin among all the scenarios in the entry of the current user in the scenario-user-choice pair data set, and if Smin is smaller than a threshold value St1, it is assumed the current scenario matches a scenario in the scenario-user-choice pair data set, and the corresponding user choice to the scenario is used in operating the vehicle.

If a scenario match could not be found, a suggestion is generated based on the traits of user for operation of the vehicle for example by categorizing the traits of a user into one of the following groups in response to events in the Emergency Zone:
A. Habitual traffic violation offenders
B. Strict traffic rule followers
C. Smart and flexible drivers
D. Altruism volunteer heroes While classifying an individual user to above categories or another type of categorization from the acquired user profile data set based on behavior modeling may not be fully objective and accurate, generating from each category a suggestion on a preferred behavior of the vehicle operation is also only of a probability nature. For example, in the Example 1 of the previously listed five example scenarios, although there is a tendency with a high probability for traits B group users to select the answer A "brake", while traits C group users might select the answer B "swing", it should not be assumed to be an affirmative action. For events in the Cruise Zone, a categorization based on user driving styles in Example 5 is as follows:

A. Smooth and steady
B. Swift and jerky
C. Aggressive with sport flavor which could be rendered in the vehicle operations in favor of a user choice or style when it is safe and lawful.

Certain restrictions are applied as a default setting for self-driving motor vehicles in general. For example, since this disclosure is not concerned about the application to use the driver-less technology for a battle vehicle in a war or for a vehicle for law enforcement, the self-driving motor vehicle is to be inhibited to be engaged in any offensive action against any third parties, including pedestrians, other vehicles etc. It should also be barred from any self-destruction behavior such as running out of a cliff or against a road barrier or walls of a building, unless the Control System of the robot determines such a move is necessary for reducing the seriousness of an otherwise unavoidable accident and a user has optioned such a choice in the scenario-user-choice pair data set. Although in general, applying a user choice or reference a user profile is in operating a self-driving motor vehicle is intended to satisfy experience and expectation of a user, there are exceptions on the contrary, for example, if a user riding a self-driving motor vehicle is found to be drunk by an alcoholic sensor, or to be a habitual reckless driving offender, certain functions such as user overriding the robot for manually operating the vehicle should be restricted.

When multiple users are riding a self-driving motor vehicle, it is optional for the riders to select one of the riders as the current user, and apply scenario-user-choice pair data of the current user in the scenario-user-choice pair data set or refer to user profile data of the current user in the user profile data set in assisting the operation of the vehicle. In case there is no passenger riding the vehicle, a default or selective set of factory settings, or scenario-user-choice pair data and/or user profile data of a designated user could be elected in assisting the vehicle operation.

A continuing user customization by user adaptation and learning during driving is illustrated in FIG. 3 by module 380, particularly if the user is a recurrent one such as an owner of the vehicle. In a first example embodiment, the robot prompts messages and/or make announcements, through visual, sound or other types of media about an unfamiliar and/or untrained and/or hazardous roadway and traffic condition, and asks for guidance or command from the user, executing the guidance or command assisting the operation upon receiving the guidance or command. Then the robot conducts evaluation of the effect or performance of the operation, if the performance is satisfactory without an accident, generates a description of the scenario from the driving records, and takes the guidance or command as a user choice to form a scenario and user choice pair, and with an explicit consent from the user, inserts the resulting scenario and choice pair into the entry of the user in the scenario-user-choice pair data set. An explicit consent from the user is to make sure that the user knows and commit to a new item of a scenario-user-choice pair being added, since the user would assume at least partial responsibility for the consequence for the operation according to the choice in a matched scenario. The updated scenario-user-choice pair data set is checked and used to update the traits section of the user profile data, and both updated data sets will be applied in the driving afterwards. In a second example embodiment, the user could take over the driving physically when necessary and if it is feasible in the design, or take initiatives to direct driving behavior of the robot through an interactive interface, and a similar process to that used in the first example embodiment could be used to update the two user data sets. Moreover, the robot could chat with a user through a user interface and/or monitor a gaze, and/or a gesture of a user, and/or use other procedures to detect and analyze the user's verbal, and/or tactile, and/or body languages reflecting his or her experiences and/or sentiments during the driving, and tune its operation accordingly, and the process could be used to expand and/or update the user profile data sets whenever applicable. Thereby, a customized operation of a self-driving motor is realized and could be incrementally refined.

The methods disclosed hereby could help resolve some of the controversial legal and/or moral issues including but not limited to those illustrated in the examples above. For instance, the manufacturer and/or the service provider and/or the insurance provider of a self-driving motor vehicle operating on default factory settings is usually supposed to assume all liabilities for the vehicle being used. However, acquiring and applying scenario-user-choice pair data in a scenario-user-choice pair data set establishes a commitment between the vehicle and a user, wherein if the vehicle faithfully executes a user choice in a scenario matching a scenario in a scenario and user choice pair in the entry of the current user in a scenario-user-choice pair data set, the current user assumes at least partial responsibilities for consequences of the operation, which could resolve some controversial legal issues in addition to benefits of reducing areas of uncertainties and complexities in a Control System design.

One major hurdle in legalization of and issuing a vehicle license to self-driving motor vehicles has been the concern over their impersonal and/or unpredictable behaviors in handling abrupt, and/or unpredicted and/or conflicting-interest events. In that regard, assuming other essential functionalities and performance of a self-driving motor vehicle are qualified, a training collection of scenarios and one or more selective vehicle operating behaviors in each of the scenarios used for acquiring a scenario-user-choice pair data set could serve as a complementary qualifying criteria evaluated by government regulatory agencies to get over the hurdle for issuing a vehicle license and/or a driver license, since it manifests a well-defined verifiable and/or verified lawful operation behaviors in various scenarios offered to and accommodating any users, and an instance of a user customization as detailed above will result in nothing less than personized predictable lawful vehicle operations, as if a conventional motor vehicle is driven by a human driver with at least a better-than-average driving record. A comparison between a customized and non-customized generic self-driving motor vehicle as illustrated in FIG. 7 serves as a support to the idea. Module 711 denotes a range of uncertain and/or unpredictable operation behaviors without user customization, within the restraint of traffic rules and laws, while module 712 comprising 711, denoting a range of operation behaviors with user customization incorporating user attributes, within the restraint of broader laws comprising traffic rules and laws. A vehicle license could be issued by government regulatory agencies and/or local traffic law administrative agencies in charge of vehicle license issuance to a self-driving motor vehicle if the scope of scenarios and of selective vehicle operation behaviors for each of the scenarios in the training collection for acquiring a scenario-user-choice data set covers a legitimate area and the selective vehicle operation behaviors in each of the scenarios are lawful, being verifiable and/or verified by simulation and/or road tests, the self-driving motor vehicle uses the customized methods introduced in this invention operating the vehicle, comprising in a scenario matching a scenario in a scenario-user-choice pair data in an entry of a current user in a scenario-user-choice pair data set executing the user choice in the scenario-user-choice pair data, and if other functionalities and the performance of the self-driving motor vehicle in scenarios not included in the training collection are also qualified. Alternatively, a training collection in combination with a scenario-user-choice pair data set and/or a user profile data set having acquired data in an entry of a user could be evaluated as a complementary quality and/or performance criterion by government regulatory agencies and/or local traffic law administrative agencies in charge of vehicle license issuance to issue a vehicle license and/or a sale permit and/or a service permit to a self-driving motor vehicle, and/or to issue a purchase and/or service permit to the user for purchasing and/or using a service of a self-driving motor vehicle, if the scope of scenarios in the training collection and the scope of scenarios in acquired scenario-user-choice pairs in an entry of the user in the scenario-user-choice pair data set covers a legitimate area and selective vehicle operation behaviors in each of the scenario are lawful, being verifiable and/or verified by simulation and/or road tests, the self-driving motor vehicle uses the customized methods introduced in this invention operating the vehicle, comprising in a scenario matching a scenario in a scenario-user-choice pair data in an entry of a current user in a scenario-user-choice pair data set executing the user choice in the scenario-user-choice pair data, and if other functionalities and the performance of the self-driving motor vehicle in scenarios not included in the training collection are also qualified. A conditional purchase and/or service permit could be issued to a user based on the acquired data in the entry of the user in the scenario-user-choice pair data set, and/or in the user profile data set.

The training collection could be designed by a manufacturer of self-driving motor vehicles, and/or by an institution and/or an individual other than a manufacturer of self-driving motor vehicles in accordance with the traffic rules and laws of an area, and/or of a city and/or of a state and/or of a country, to be adopted by a local agency in charge of issuing a vehicle license as a general standard within the locality of its jurisdiction, and a vehicle license valid at least within the locality could be issued to a vehicle of any manufactures meeting the general standard. Meanwhile, the acquired scenario-user-choice pair data set, and/or the user profile data set could be used to determine the conditions and/or qualifications for a user to purchase or use the service of a self-driving motor vehicle.

Design of a training collection could be accomplished by many ways, and some example methods are described below for illustration without limiting the scope of the invention.

Selecting scenarios into a training collection is carried out by starting from a statistical analysis of conventional motor vehicle scenario data and/or data from simulations and road tests of self-driving motor vehicles, wherein the data are categorized and/or quantized. Scenarios are assigned a weight respective to their appearance probability, level of abruptness or uncertainty, and level of risks involving attributes of a user of a self-driving motor vehicle in handling conflicts of interests between traffic rules and laws, safety of a self-driving motor vehicle and/or the user of the self-driving motor vehicle, and/or other parties sharing roadways. Find a combined weight by a weighted average of individual weight or by a different rule or algorithm. Sorting the scenarios according to the combined weight. Selecting into the training collection the scenarios prioritized according to a descending combined weight, until to a threshold corresponding to a dominant certainty condition. An analogy to this process is as illustrated in FIG. 2, wherein the uncertain keeps decreasing from the blinking zone to the emergency zone and the cruise zone. Obviously, for scenarios in the cruise zone, referencing a user profile data set could be a sufficient and more suitable option in customizing a self-driving motor vehicle.

Respective to each scenario in a training collection, a set of operational behaviors are generated through analysis of conventional vehicle statistics data and/or data generated from self-driving motor vehicle simulations and/or road tests, and a probability of appearance of an operational behavior in a scenario could be derived by for example a histogram analysis. An operational behavior comprises one basic vehicle operation or a synchronized sequence of basic vehicle operations such as speeding up, speeding down, moving forward or backing up, making turns, braking, lights and sound controls. Different operational behaviors could result in biased interest in favor of different parties involved in the scenario. One psychological behavior model is established based on the driving style and/or moral and/or ethics traits of the users, forming a probability density distribution between extreme selfish at one side and altruism at the other side, while other modeling options could consider multiple psychological behavior factors to form a multiple dimensional density distribution named hereby as a user psychological behavior probability density distribution. The entire distribution range is divided into a plurality of segments or regions, and the probability of each segment or region corresponds to a group of users with similar psychological behavior pattern of driving styles and/or moral and/or ethics traits. If a group of users could be mapped to a match in the set of the operational behaviors of the self-driving motor vehicle in a scenario of a training collection, with a probability of appearance higher than a threshold, the matching operational behavior is qualified to be a candidate as a selective operational behavior for the user to choose from to form a scenario-user-choice pair. It is obvious the smaller the segment and the threshold, the more available candidates, and vice versa. From practical usage point of view, a compromise is to be achieved between the efficiency of operation, the granularity of user groups and coverage of the psychological behaviors.

An alternative approach is to start from the set of operational behaviors and find a matching user group in the psychological behavior probability density distribution, the probability of which is bigger than a threshold. Another alternative approach is to establish a correlated probability density distribution between the psychological behavior user group and the operational behavior set of the self-driving motor vehicle in each scenario.

There could be more alternatives than the applicant could enumerates, and the methods to generate a training collection could be carried out by algorithms of pattern classification, learning and/or other AI techniques, or just by ordinary skilled professional with adequate knowledge, experience and training using simple statistical tools to process the statistical conventional vehicle operational data and/or data from simulation and/or road tests of self-driving motor vehicles correlating driving styles and moral and/or ethics traits of users, and following the traffic rules and laws wherever the self-driving motor vehicles are used. Variations in controls and maneuverability of self-driving motor vehicles, and different traffic rules and laws in different areas and/or countries require a distinctive design for a training collection as a complementary criterion for issuing a vehicle license to a self-driving motor vehicle. However, the introduced complementary criterion in company with the methods of customization should find itself generally applicable in facilitating the legalization self-driving motor vehicles by increasing reliability and transparency in vehicle operation behaviors and reducing the worries and panics from the legislators and the public over their performance in high risk, uncertain and conflicting-interest scenarios.

Customizing a self-driving motor vehicle in manufacturing comprises an efficient design of a Control System, being capable of fast accessing and searching the data structures of scenario-user-choice pair data set, and/or the user profile data set; running fast scenario matching; efficiently operating according to a user choice in a matched scenario and intelligently integrating suggestions generated out of referencing user profile data with non-user-specific analysis based operation options. In addition to a general design scheme outlined above, a user attributes based custom design in manufacturing process will further reduce design complexity and time to service, and increase reliability and productivity as well. A training collection for acquiring a scenario-user-choice pair data set could be model dependent and/or standard dependent and therefore only needs to be generated or acquired once per modal and/or per standard. The scenario-user-choice pair data set, and the user profile data set of one or more users whom a customer design targets are pre-acquired and imported to a robot of the vehicle being manufactured, and the robot take the time integrating the scenario and user choice data set and the user profile data set with the Control System, running simulations or road tests if needed, tuning the Control System and other parts of the vehicle to an optimal condition and initializing settings of the vehicle according to specified condition of the current user ordered by the custom design before delivering the vehicle to a customer.

In all, the methods disclosed hereby should find them implementable by ordinary skilled professionals in the field, and the applicant would like to claim the rights and benefits to the scope of the invention as follows.

What is claimed is:

1. A method of customizing operation of a self-driving motor vehicle comprising:
   obtaining a training collection of data of a plurality of scenarios and a collection of data of one or more operation behaviors of a self-driving motor vehicle in each of the scenarios, wherein the training collection comprises being verified and/or verifiable by simulation and/or road test and the data of one or more operation behaviors of a self-driving motor vehicle in each of the scenarios being lawful;
   acquiring a scenario-user-choice pair data set of one or more users based on the training collection in manufacturing the self-driving motor vehicle and/or prior to operating the self-driving motor vehicle on a public roadway, wherein the scenario-user-choice pair comprises a data structure of data of an user-chosen operation behavior of a self-driving motor vehicle in a scenario and data of the scenario;
   acquiring a user profile data set of the one or more users in manufacturing the self-driving motor vehicle and/or prior to operating the self-driving motor vehicle on a public roadway;
   identifying a current user, wherein data have been acquired in an entry of the current user in the scenario-user-choice pair data set and in an entry of the current user in the user profile data set of the self-driving motor vehicle prior to operating the self-driving motor vehicle on a public roadway;
   a robot of the self-driving vehicle is operating the self-driving motor vehicle based on the scenario-user-choice pair data set and/or the user profile data set comprising:
   finding a match between a current scenario and a scenario in a scenario-user-choice pair in the entry of the current user in the scenario-user-choice pair data set, and executing an operation of the self-driving motor vehicle according to an operation behavior in the scenario-user-choice pair, and generating a suggestion how to handle the current scenario based on the data of the current user in the entry in a user profile data set if a match is not found.

2. The method of claim 1, wherein the scenarios in the training collection comprises conflicts of interests existing involving moral and/or ethics traits of the user, and/or laws and traffic rules, and/or risks to safety of a user and/or a self-driving motor vehicle and/or other parties sharing roadways.

3. The method of claim 1, wherein the scenarios in the training collection further comprises uncertainties existing of operating a self-driving motor vehicle to match an intention of a user.

4. The method of claim 1, wherein the acquiring a scenario-user-choice pair data set comprises the steps of:
   identifying a user;
   acquiring data of scenario-user-choice pairs of the user including:
      presenting to the user scenario-by-scenario of all the scenarios in the training collection data of a scenario and a collection of data of one or more operation behaviors of a self-driving vehicle in the scenario;
      informing the user responsibilities of consequences of the one or more operation behaviors in the scenario;
      obtaining a user choice of a preferred operation behavior in the scenario;
      storing data of the scenario and data of the preferred operation behavior of the user choice as a scenario-user-choice pair in an entry of the user in the scenario-user-choice pair data set; or receiving data of scenario-user-choice pairs in an entry of the user in the scenario-user-choice pair set, wherein the of scenario-user-choice pairs are previously acquired, or combining the obtained and the received data, and confirming and/or updating data of the scenario-user-choice pairs in the entry of the user in the scenario-user-choice pair data set prior to operating the self-driving motor vehicle on a public roadway.

5. The method of claim 1, wherein the acquiring a user profile data set comprises the steps of:
   identifying a user;
   acquiring data of user profile of the user including:
      obtaining data of background information provided by the user and/or by researching public records;

storing the obtained data of background information in a background section in an entry of the user in the user profile data set;

extracting data of traits of the user based on the data in the entry of the user in a scenario-user-choice pair data set and/or the data in the background section in the entry of the user in the user profile data set and storing the extracted data of traits of the user in the traits section in an entry of the user in the user profile data set; or receiving obtained data of background information and/or data of extracted traits of the user, or combining the obtained and the received data, and confirming and/or updating the data of the user in the user profile data set prior to operating the self-driving motor vehicle on a public roadway.

6. The method of claim 1, further comprising updating the scenario-user-choice pair data set and/or the user profile data set during driving in the steps of:

executing a guidance or command by a current user communicated to the self-driving motor vehicle through a user interface in a scenario operating the self-driving motor vehicle;

conducting an evaluation of performances of the operation;

generating data of a scenario-user-choice pair based on the scenario and the guidance or command and inserting the data of scenario-user-choice pair into the entry of the current user in the scenario-user-choice pair data set with explicit consent from the current user if the performance of the operation being satisfactory including resulting in no accidents, and/or recording and analyzing data of scenarios and data of driving behaviors of a current user physically taking over operation of a self-driving motor vehicle;

conducting an evaluation of performance of the operation;

generating data of scenario-user-choice pairs based on the data of scenarios and data of the driving behaviors of the current user and inserting the data of scenario-user-choice pairs into the entry of the current user in the scenario-user-choice pair data set with explicit consent from the current user if the performances is satisfactory including resulting in no accidents; extracting data of user traits and inserting the extracted data of user traits into and/or updating data of user traits data in the entry of the current user in the user profile data set; and/or automatically detecting facial and/or body languages of the current user reflecting experiences of the current user;

tuning operations of the self-driving motor vehicle; extracting data of user traits and inserting the data of extracted user traits into and/or updating data of user traits in an entry of the current user in the user profile data set.

7. The method of claim 1, further comprising manufacturing a control system of the self-driving motor vehicle having the capacity of:

fast accessing and searching data structures of scenario-user-choice pair data set, and/or the user profile data set;

running fast scenario matching;

operating the self-driving motor vehicle according to data of an operation behavior in a scenario-user-choice pair in a matched scenario and integrating data of suggestions generated by referencing user profile data with data generated by non-user-specific analysis.

8. The method of claim 1, further comprising manufacturing the self-driving motor vehicle according to a custom design in the steps of:

acquiring a scenario-user-choice pair data set and a user profile data set of one or more users targeted by the customer design;

integrating the acquired scenario and user choice data set and the user profile data set with the control system;

running simulations and/or road tests if needed;

tuning the self-driving motor vehicle to an optimal condition, and initializing settings of the self-driving motor vehicle according to the custom design.

9. The method of claim 1, further comprising: a regulatory and/or administrative agency in charge of issuing self-driving motor vehicle licenses and/or driving certificates evaluating the training collection as a complementary criterion and issuing a vehicle license and/or a driving certificate to the self-driving motor vehicle to carry one or more passengers under the conditions of:

a scope of the data of a plurality of scenarios in the training collection covering a legitimate area; and performances of the operation of the self-driving motor vehicle in scenarios other than in the training collection being qualified.

10. The method of claim 1, further comprising: a regulatory and/or administrative agency in charge of issuing self-driving motor vehicle licenses and/or driving certificates evaluating data in an entry of the current user in the scenario-user-choice pair data set as a complementary criterion and issuing a vehicle license and/or a driving certificate to the self-driving motor vehicle to carry one or more passengers under the conditions of:

the vehicle license and/or a driving certificate is valid only applicable to the current user purchasing or using services of the self-driving motor vehicle;

a scope of scenarios of the data in the entry of the current user in the scenario-user-choice pair data set covering a legitimate area; and performances of the operation of the self-driving motor vehicle in scenarios other than in the entry of the current user in the scenario-user-choice pair data set being qualified.

11. The method of claim 1, further comprising:

using acquired data of the current user in the user preference data set and/or in the user profile data set before and/or during a vehicle service to determine how to provide the vehicle service to the current user.

12. The method of claim 1, wherein the executing an operation of the self-driving motor vehicle according to an operation behavior in the scenario-user-choice pair comprises the current user assuming responsibilities for consequences of the executing if the current user is a rider or passenger on the self-driving motor vehicle.

13. The method of claim 1, wherein the obtaining a training collection of data of a plurality of scenarios and a collection of data of one or more operation behaviors of a self-driving motor vehicle in each of the scenarios comprises designing a training collection or receiving a designed training collection or a combination of the designing and the receiving.

14. The method of claim 13, wherein the designing a training comprises the steps of:

obtaining a first scenario data set from data of conventional motor vehicle driving records and/or from simulations and/or road tests of self-driving motor vehicles;

assigning a first adjustable weight to data of a scenario in the first scenario data set according to a probability value of appearance of the scenario, a second adjustable weight according to a level of uncertainty operating a self-driving motor vehicle in the scenario, and a third adjustable weight according to a level of conflicts of interests involving traits of a rider, laws and traffic rules, safety of a self-driving motor vehicle and/or the rider and/or other parties sharing roadways;

finding a combined weight by a weighted average of the first, second and third weights;

sorting the data of the first scenarios data set in a descending order according to values of the combined weight of data of the scenarios;

selecting into the training collection of scenarios data of scenarios in the sorted first scenario data set in a top-down order according to the values of the combined weight of the data of the scenarios, until to an adjustable first threshold value of the combined weight;

acquiring a second operation behavior data set of one or more operation behaviors in a scenario in the training collection based on data of conventional vehicle driving records and/or data of self-driving motor vehicle simulations and/or road tests;

removing unlawful data of operation behavior from the second operation behavior data set;

finding a probability value of appearance of each of the one or more operation behaviors;

removing data of operation behavior having a probability value of appearance smaller than an adjustable second threshold from the second operation behaviors data set;

obtaining a third user group data set based on a psychological behavior model of driving style and/or moral and/or ethics traits of users;

forming a probability density distribution of the users according to data of user profile comprising driving style and/or data of moral and/or ethics traits comprising being between extreme selfish at one side and altruism at the other side; or forming a multiple dimensional user psychological behavior probability density distribution;

dividing a range of the probability density distribution into a plurality of segments or regions of probability values, wherein each of the segments or regions corresponding to a user group with similar user profiles;

removing from the third user group data set data of user groups having a probability value smaller than a third adjustable threshold;

finding successfully data of operation behaviors in the second operation behavior data set that each user group in the remaining third user group data set intend to elect as operation behaviors in operating a self-driving motor vehicle in a scenario of the training collection;

electing the found data of the operation behaviors as data of operation behavior in the scenario of the training collection for a user to choose from to form a scenario and user choice pair;

conducting the steps from the step of acquiring to the step of electing for each of the rest of the scenarios in the first scenario data set; and achieving a compromise between operation efficiency, size of the data sets, granularities of data of the user groups and coverage of the psychological behaviors.

* * * * *